April 9, 1935.    W. W. HARRIS    1,996,919
INTERNAL COMBUSTION ENGINE
Filed Dec. 14, 1931
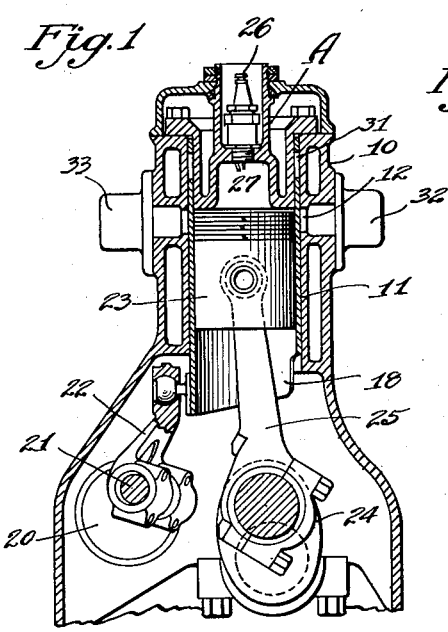
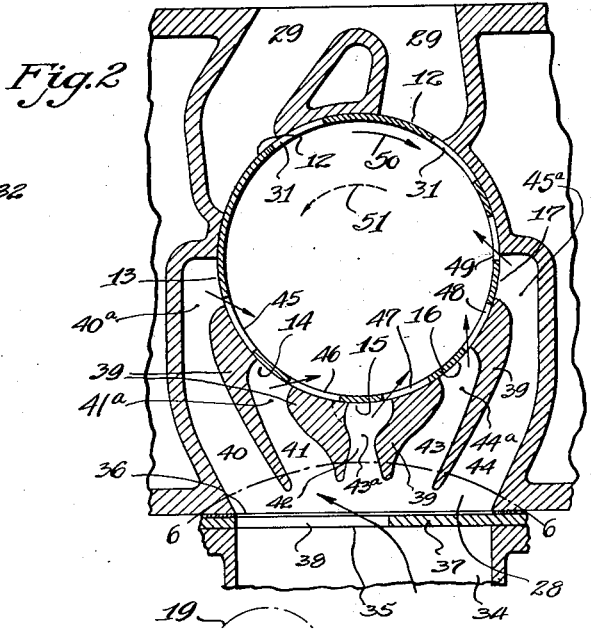
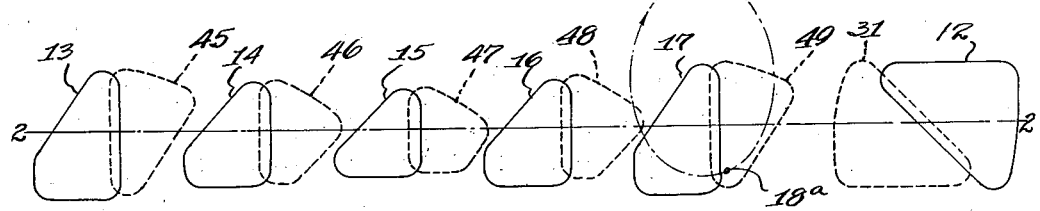
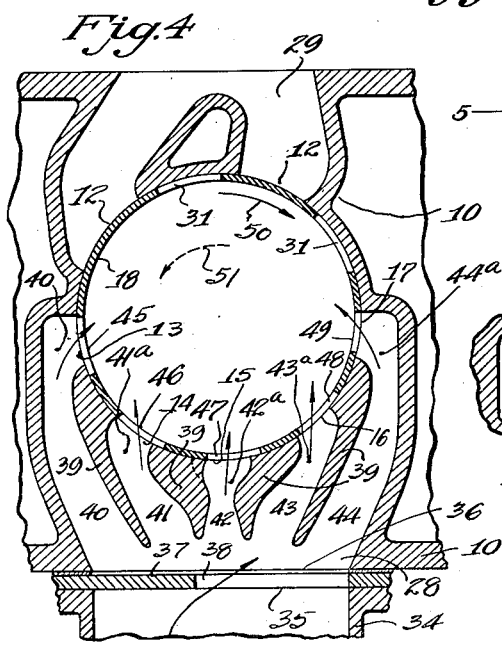
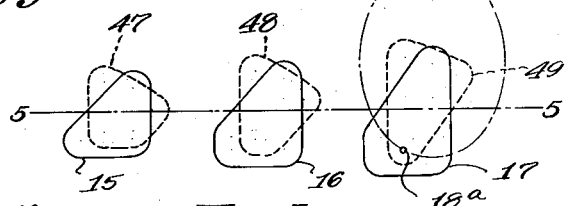
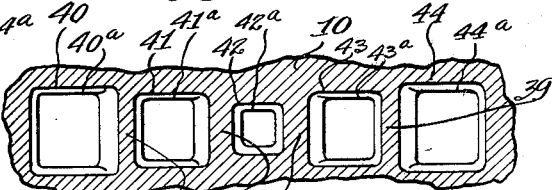
INVENTOR.
William W. Harris Patented Apr. 9, 1935

1,996,919

UNITED STATES PATENT OFFICE 1,996,919

INTERNAL COMBUSTION ENGINE

William W. Harris, Detroit, Mich., assignor to Continental Motors Corporation, Detroit, Mich., a corporation of Virginia Application December 14, 1931, Serial No. 580,745

17 Claims. (Cl. 123—81)

This invention relates to internal combustion engines and has particular reference to engines of the general class known as sleeve valve engines although the salient features of my invention are not necessarily limited to sleeve valve types of engines.

It is an object of my invention to provide improvements increasing the volumetric efficiency, power, economy and other desirable characteristics of engine performance.

A further object of my invention resides in the provision of improved means for controlling the swirl of intake gas within the engine cylinder.

A still further object of my invention in its more specific aspects resides in the provision of an engine having a plurality of gas intake passages in combination with gas conducting means for the passages tending to favor one or more of the passages more than others, and in constructing the passages in regard to their gas conducting capacities whereby the passage or passages tending to be favored will conduct relatively greater quantities of intake gas to the cylinder than another passage or passages not so favored.

A still further object of my invention resides in the provision of individual intake gas conduits for cooperating cylinder and valve ports wherein the conduits are constructed to provide varying gas conducting capacities proportioned in cooperation with the intake gas conducting means whereby to increase the volumetric efficiency of the engine and/or to facilitate control of gas swirl within the cylinder.

A still further object of my invention resides in the provision of individual intake gas conduits of the character aforesaid constructed and arranged for imparting an accelerated movement to the intake gases passing through the conduits whereby to still further increase the volumetric efficiency of the engine and/or to still further control the gas swirl.

In order to illustrate the various features and phases of my invention I have disclosed my invention in connection with an engine of the sleeve valve type generally known as the Burt-McCollum engine wherein a single sleeve valve is moved in a combined oscillating and reciprocating path in performing the valving functions of the engine. It is customary in this type of engine to open the cylinder intake ports when the sleeve valve is moving with largely rotary motion resulting for the arrangement illustrated in tangential initial gas inlet to the cylinder thereby causing the gas to swirl. As the ports open fully and approach their closing periods one or more of the intake ports in cooperation with the gas conducting passage thereto, introduces the intake gas to the cylinder in a manner to oppose the initial swirl. It is known heretofore that a certain amount of gas swirl within the cylinder is very beneficial for general engine performance although if the proper amount of swirl is obtained in the lower ranges of engine speeds, the swirl tends to become excessive at higher ranges of speeds owing to increased velocity of the intake gas and the stimulating effect on the swirl caused by movement of the engine piston during its compressing stroke. It is possible to effectively control the swirl as desired over the engine speed range by conducting or directing the intake gas to the various intake ports so as to favor to a greater or less extent the port or ports promoting or opposing engine swirl as desired. One feature of my invention resides in the provision of graduated intake passages especially adapted for engines utilizing the aforesaid directing or conducting means for the intake gas whereby the port or ports favored with greater quantities of the intake gas have relatively large gas conducting capacities.

Further objects and advantages of my invention will be apparent as this specification progresses, reference being had to the accompanying drawing in which:

Fig. 1 is a sectional elevation view through a typical cylinder of the engine,

Fig. 2 is a sectional plan view through a typical cylinder in the region of the intake ports showing the sleeve valve at the time of initial intake opening, the section being taken substantially along the line 2—2 of Fig. 3, Fig. 3 is a diagrammatic development of the cylinder and sleeve intake ports and also showing one of the cylinder and sleeve exhaust ports, Fig. 4 is a view corresponding to Fig. 2 but showing the sleeve valve substantially at full intake opening and illustrating the gas conducting means for favoring the swirl promoting ports, the section being taken substantially along the line 5—5 of Fig. 5, Fig. 5 is a diagrammatic view of a group of cylinder and sleeve intake ports substantially at the time of full intake opening, and Fig. 6 is a fragmentary sectional elevational view along the line 6—6 of Fig. 2 showing the individual intake gas conduits.

In the drawing the engine shown for purposes of illustrating my invention consists of a cylinder block 10 provided with a plurality of longitudinally spaced bores or cylinders 11, each cylinder having a plurality of exhaust ports 12 and a plurality of circumferentially spaced and arcuately arranged intake ports 13, 14, 15, 16 and 17, the ports 13 and 17 being located at the ends of the arcuate row and the remaining ports being located intermediate these end ports. While I have illustrated five cylinder intake ports and companion sleeve valve ports referred to hereinafter, I desire it understood that my invention is not limited to any particular number of ports, it being frequently common in the type of engine illustrated to provide three intake ports arcuately arranged substantially as illustrated to provide ports at the ends of the arc and a port intermediate the end ports. The single sleeve valve 18 is given a combined movement as aforesaid by any well known suitable driving mechanism whereby any point on the sleeve valve, such as the point 18a in Figs. 3 and 5 traces a closed curve path 19 with respect to its associated cylinder. While my invention is not necessarily limited to this type of sleeve valve engine it nevertheless affords particular advantages, especially in connection with certain phases thereof as will be more apparent later.

The driving means illustrated for sleeve valve 18 consists of a wobble valve shaft 20 driven at half crankshaft speed for the 4 stroke cycle engine illustrated, this valve shaft having a wobble crank 21 for each sleeve valve. The wobble crank is connected to the sleeve by link 22, suitable ball and socket structures at the ends of the link permitting the movement necessary to drive the sleeve with the aforesaid motion. Within the sleeve 18 is located the usual piston 23 operating the crankshaft 24 through the usual connecting rod 25. The outer end of the cylinder is closed by a cylinder head structure A carrying spark plug 26 and providing a combustion chamber 27 preferably of the type lending itself to axial swirling of the carbureting fuel mixture of gasoline and air or of air in the case of a fuel injection engine, generally referred to hereinafter as intake gas.

The cylinder block 10 is formed at opposite sides thereof with the intake gas chamber 28 and exhaust gas chamber 29, the exhaust chamber directing or conducting exhaust gases from the cooperating sets or pairs of cylinder and sleeve exhaust ports 12 and 31 respectively. The exhaust gases pass from chamber 29 to exhaust manifold 32 illustrated in Fig. 1.

The intake gas is conducted to the engine through the usual intake manifold 33 having branches 34 providing an outlet 35 for chamber 28, the latter having a cooperating gas inlet opening 36 at the side of cylinder block 10. Intermediate outlet 35 and inlet 36 is positioned a plate 37 having an orifice or opening 38, the plate 37 being movable or shiftable longitudinally of the cylinder block and laterally across inlet 36 whereby to selectively conduct or direct the intake gas circumferentially toward the right portion of chamber 28 as in Fig. 4, or toward the left portion of this chamber as illustrated in Fig. 2 depending respectively on whether the gas swirl is to be stimulated as for low speed or whether the gas swirl is to be checked and retarded as for relatively high engine speeds. The plate 37 may be manually adjusted or automatically adjusted by any suitable means, such as disclosed in the co-pending application of Andre J. Meyer, Ser. No. 577,428, filed November 27, 1931, and assigned to the assignee herein. The intake chamber 28 is formed with a plurality of partitions 39 forming gas conduits 40, 41, 42, 43 and 44 respectively and individually conducting intake gas to the cylinder intake ports 13, 14, 15, 16 and 17. These gas conducting conduits or intake chamber conduits open outwardly toward chamber inlet 36 and extend inwardly toward the cylinder so as to terminate in the respective cylinder intake ports. The conduits are graduated as shown in Fig. 6 with respect to their cross-sectional areas transversely to the direction of gas flow whereby the outermost conduits or those supplying the intake ports at the ends of the arcuate row of ports have greater gas conducting capacity than the conduit or conduits intermediate the arcuate ends, the arrangement being such that the conduits having relatively greater cross-sectional areas receive relatively greater amounts of intake gas directed thereto by the plate 37. Thus the relative sizes of the intake conduits are substantially proportioned to the tendencies of the gas to flow in predetermined paths. I have illustrated the intake chamber conduits as having their cross-sectional areas gradually decreasing inwardly toward the cylinder to a restricted zone respectively indicated as 40a, 41a, 42a, 43a, and 44a, the cross-sectional areas then increasing to terminate in the respective cylinder intake ports. By reason of this construction the intake gas passing through the conduits will be given an accelerated movement which will increase the amount of gas passing through the conduits.

The sleeve valve 18 is provided with an arcuate row of circumferentially spaced intake ports corresponding to the cylinder intake ports so as to form pairs or sets of ports therewith, these sleeve intake ports being designated as 45, 46, 47, 48 and 49. Like the cylinder intake ports, the sleeve ports are graduated in size, the larger ports being at the ends of the arcuate row whereby the sleeve and cylinder intake ports cooperate to provide gas passages at least one of which is relatively large in cooperation with gas conducting means tending to favor such relatively large gas passage.

Referring to Fig. 2 the sleeve valve is illustrated as being moved in the direction indicated by arrow 50, the arrows shown at the passages provided by the sleeve and cylinder ports tending to produce a gas swirl within the engine cylinder indicated by arrow 51. In Fig. 4 where the cylinder and sleeve ports are substantially fully opened, the gas enters the sleeve ports to the right of chamber inlet 36 in a manner to stimulate gas swirl, the gas entering the sleeve intake ports to the left of said chamber inlet 36 in a manner tending to oppose said swirl as indicated by the arrows through the sleeve intake ports in Fig. 4. It will be apparent that when the plate 37 is shifted as in Fig. 2 to favor the port or ports to the left, then the swirl will tend to be retarded, this position being particularly useful at higher engine speeds. When the plate 37 is shifted as in Fig. 4 to favor the right port or ports, then the swirl will tend to be stimulated, this position being especially beneficial at low engine speeds. The plate 37 may be manually moved or suitably connected for movement in response to engine speeds whereby to obtain substantially constant swirl conditions over the entire range of engine speeds, such means not being illustrated as it is not a part of this invention per se.

Instead of having the plate 37 as a shiftable element, such intake gas directing means may be fixed in position for effecting a compromise swirl condition in the engine or where the engine is adapted to operate over a substantially constant engine speed or over engine speeds having a relatively narrow range of variation.

Various modifications and changes may be made over my disclosure and within the scope of my invention and I do not limit my invention to the particular construction and details described and illustrated.

What I claim as my invention is:

1. In an internal combustion engine, a cylinder provided with a plurality of intake ports, valve means controlling said ports, means for directing intake gas to said cylinder ports, said directing means being adapted to direct a larger quantity of the intake gas toward one of said cylinder ports than to another, said cylinder ports having relatively different gas conducting capacities.

2. In an internal combustion engine, a cylinder provided with a plurality of intake ports spaced circumferentially in the wall thereof, sleeve valve means ported for cooperation with said cylinder ports to provide a plurality of intake gas passages, means for supplying intake gas in different amounts to said passages, said passages having relatively different gas conducting capacities.

3. In an internal combustion engine, a cylinder provided with a plurality of intake ports spaced circumferentially in the wall thereof, sleeve valve means ported for cooperation with said cylinder ports to provide a plurality of intake gas passages, means for supplying intake gas in different amounts to said passages, the passage receiving the greater amount of intake gas having a relatively greater area transversely to the gas flow than the area of the passage receiving a lesser amount of intake gas.

4. In an internal combustion engine, a cylinder provided with a plurality of intake ports spaced circumferentially in the wall thereof, sleeve valve means ported for cooperation with said cylinder ports to provide a plurality of intake gas passages, means directing intake gas toward said passages to favor one of said passages more than another, said favored passage having a greater gas conducting capacity than said other passage.

5. In an engine of the sleeve valve type, a cylinder having a row of intake ports spaced circumferentially thereof, sleeve valve means controlling said cylinder ports, means conducting intake gas to said ports whereby to favor one of said ports more than another, said favored port being constructed to accommodate greater gas passage therethrough than through said other port.

6. In a sleeve valve engine, a cylinder ported for gas intake, means conducting gas to the cylinder ports whereby to favor one of said ports more than another, sleeve valve means controlling said ports and having a row of intake ports spaced circumferentially thereof, the sleeve valve intake port controlling said favored cylinder intake port being constructed to accommodate greater gas passage therethrough than through another of said sleeve valve intake ports.

7. In an internal combustion engine having a cylinder provided with a plurality of circumferentially spaced intake ports, valving means for said ports, means for conducting intake gas to said ports including an inlet arranged substantially symmetrically with respect to said intake ports, said ports being constructed to provide relatively different gas passage capacities graduated in proportion to their proximity to said inlet.

8. In an internal combustion engine having a cylinder provided with a plurality of circumferentially spaced intake ports, valving means for said ports, means for conducting intake gas to said ports including an inlet, the ports remote from said inlet providing larger gas passages than a port relatively near said inlet.

9. In an internal combustion engine, a cylinder provided with an arcuate row of spaced ports extending through the wall thereof, valve means controlling said ports, means conducting intake gas to said ports whereby to favor the port at one end of said arcuate row, said favored port constructed to provide for more gas passage therethrough than the gas passage provided by a port intermediate the ends of said arcuate row.

10. In an internal combustion engine, a cylinder having an arcuate row of spaced ports through the wall thereof and including end ports and an intermediate port, means conducting intake gas to said ports, said ports having gas conducting capacities graduated decreasingly from said end ports to said intermediate port.

11. In an engine of the sleeve valve type, a cylinder block having a cylinder formed therein and provided with a plurality of spaced intake ports extending through the cylinder wall, sleeve valve means associated with said cylinder and having a plurality of spaced intake ports for controlling said cylinder ports, said cylinder block having an intake chamber opening laterally at one side thereof, said chamber having a plurality of partitions formed therein providing fuel mixture conduits respectively opening outwardly toward said chamber opening and terminating inwardly of the cylinder block in said cylinder intake ports, means for directing intake gas in different amounts to said conduits, said conduits having relatively different gas conducting capacities.

12. In an engine of the sleeve valve type, a cylinder block having a cylinder formed therein and provided with a plurality of spaced intake ports extending through the cylinder wall, sleeve valve means associated with said cylinder and having a plurality of spaced intake ports for controlling said cylinder ports, said cylinder block having an intake chamber opening laterally at one side thereof, said chamber having a plurality of partitions formed therein providing fuel mixture conduits respectively opening outwardly toward said chamber opening and terminating inwardly of the cylinder block in said cylinder intake ports, means for directing intake gas in different amounts to said conduits, said conduits having relatively different gas conducting capacities, said conduits being constructed to accelerate the gas flow therethrough.

13. In an internal combustion engine, a cylinder having an arcuate row of spaced ports through the wall thereof and including end ports and an intermediate port, individual gas conducting conduits for said ports respectively, the conduits for said end ports being constructed to provide for greater gas conducting capacity than that provided by said intermediate conduit.

14. In an internal combustion engine, a cylinder having an arcuate row of spaced ports through the wall thereof and including end ports and an intermediate port, individual gas conducting conduits for said ports respectively, the conduits for said end ports being constructed to provide for greater gas conducting capacity than that provided by said intermediate conduit, said conduits being constructed to accelerate the flow of gas therethrough.

15. In an engine, a cylinder, sleeve valve means, said cylinder and sleeve valve means having a plurality of cooperating intake ports providing gas passages of progressively differing capacity.

16. In an engine, a cylinder, sleeve valve means, said cylinder and sleeve valve means having a plurality of cooperating intake ports arranged in a circumferential row and providing gas passages of increasing capacity toward one end of the row.

17. In an engine, a cylinder, sleeve valve means, said cylinder and sleeve valve means having a plurality of cooperating intake ports arranged in a circumferential row and providing gas passages of increasing capacity toward opposite ends of said row.

WILLIAM W. HARRIS.